United States Patent
Pond

(10) Patent No.: US 10,922,695 B2
(45) Date of Patent: Feb. 16, 2021

(54) USER INTERFACE FOR CUSTOMER ASSISTANCE

(71) Applicant: HRB Innovations, Inc., Las Vegas, NV (US)

(72) Inventor: David A. Pond, Kansas City, MO (US)

(73) Assignee: HRB Innovations, Inc., Las Vegas, NV (US)

( * ) Notice: Subject to any disclaimer, the term of this patent is extended or adjusted under 35 U.S.C. 154(b) by 274 days.

(21) Appl. No.: 15/785,736

(22) Filed: Oct. 17, 2017

(65) Prior Publication Data

US 2019/0114647 A1 Apr. 18, 2019

(51) Int. Cl.
| | | |
|---|---|---|
| *G06Q 10/00* | (2012.01) | |
| *G06Q 30/00* | (2012.01) | |
| *G06F 3/0484* | (2013.01) | |
| *H04N 7/14* | (2006.01) | |
| *H04N 7/15* | (2006.01) | |

(52) U.S. Cl.
CPC ......... *G06Q 30/016* (2013.01); *G06F 3/0484* (2013.01); *H04N 7/147* (2013.01); *H04N 7/15* (2013.01)

(58) Field of Classification Search
CPC ........ G06Q 30/016; H04N 7/147; H04N 7/15; G06F 3/0484
See application file for complete search history.

(56) References Cited

U.S. PATENT DOCUMENTS

| | | | | |
|---|---|---|---|---|
| 9,704,137 | B2 * | 7/2017 | Berger | G06Q 10/101 |
| 2004/0128389 | A1 * | 7/2004 | Kopchik | G06F 21/34 |
| | | | | 709/228 |
| 2009/0281967 | A1 * | 11/2009 | Jaffer | H04M 3/5191 |
| | | | | 706/11 |
| 2014/0101262 | A1 * | 4/2014 | Wu | H04L 51/046 |
| | | | | 709/206 |
| 2015/0032686 | A1 * | 1/2015 | Kuchoor | G06Q 10/101 |
| | | | | 707/608 |

OTHER PUBLICATIONS

"Expertcity.com Adopts Seagate Software eBusiness Solutions" PR Newswire [New York] Jun. 21, 2000: 1.*
Learning ProConnect Tax Online; Intuit Inc.; Copyright 2017; Date Printed: Jan. 18, 2018; Date Posted: Unknown; (https://proconnect.intuit.com/tax-online/training-courses/>.

* cited by examiner

*Primary Examiner* — Gabrielle A McCormick
(74) *Attorney, Agent, or Firm* — Erise IP, P.A.

(57) ABSTRACT

A system for providing communication between a first user on a first user interface and a second user on a second user interface is disclosed. The user interface may provide a document with a set of questions and fields for the first user to respond to the questions. Additionally, the first user interface may provide an option for requesting assistance from the second user on the second user interface. The second user may be presented all or some of the information from the first user interface on the second user interface. The second user may assist the first user or complete the document independently.

20 Claims, 4 Drawing Sheets

USER INTERFACE FOR CUSTOMER ASSISTANCE

BACKGROUND

1. Field

Embodiments of the invention generally relate to providing support for clients using a computer software system. More specifically, a fast response fast solution method directed to solving technical issues for a client by a professional is provided.

2. Related Art

Traditionally, clients having technical issues while working with software have submitted a written description of the problem online and waited for a customer support team's response. The wait time could range from minutes to days. The client was at the mercy of the customer support system and the volume of customers in need of support. Alternatively, a call may be made where the client is typically put on hold waiting to speak to a representative. This process has also been known to lead to hours of waiting for what may be a quick and easy fix or just a simple answer to a question. This procedure is performed for problems such as technical issues, general questions, user interface navigation confusion, or simple errors made by the client. The time, expense, and frustration to the client is compounded by having the professional attempt to walk the client through the process to resolve the issue by phone, web chat, and just marking or labeling where the error has occurred. There is a need for a system that allows a client and professional to view and edit the document together while in direct communication. Since some information may be personal and the client unwilling to release that information, there may be settings allowing the client to keep some information concealed. The client may also only need a quick answer to a question and only a page or a question on a page need be viewed by the professional. There may also be a need for a client to be able to hand-off the process to a professional for an immediate fix. The control may be given to the professional that is skilled in the process and may resolve the issue quickly. The client may watch and learn what the professional is doing becoming able and competent the next time an issue arises. This quick access and communication would increase the efficiency of customer service calls and allow for a better experience to the client.

SUMMARY

A first embodiment of the invention addresses the above-described need by providing for a system that provides a user interface to a first user on a first display and a second user interface on a second display to a second user. The first user interface provides a set of questions and associated fields for response to the questions by the first user, wherein the first user may respond to a question in a field. The first display is communicatively coupled to a second display providing the second user interface to the second user. The first user interface provides an option for the first user to request assistance from the second user via the first user interface. The second user may accept the assistance request via the second user interface. The first user and second user may communicate via the first and second user interfaces. The second user interface may display information indicative of the first user interface to the second user and the second user has access to, and can edit, the first user interface.

A second embodiment of the invention provides for a non-transitory computer-readable media storing computer-executable instructions that, when executed by a processor, perform a method for a first user on a first user interface to communicate with a second user on a second user interface. The first user interface may display a set of questions and fields for the first user to input responses to the set of questions. The first user may respond to a question of the set of questions in a field. The first user interface may provide the first user the option of requesting assistance from a second user on a second user interface. The second user interface may provide information to the second user indicative of the first user interface and the second user may edit the response of the first user on the second user interface. The first and second users may communicate directly via the first and second user interfaces.

A third embodiment of the invention addresses the above-described need by providing a method for a first user on a first user interface to communicate with a second user on a second user interface. The first user interface may display a set of questions and fields for the first user to input responses to the set of questions. The first user interface may provide the first user the option of requesting assistance from a second user on a second user interface. The second user interface may provide information to the second user indicative of the first user interface. The information provided to the second user via the second user interface may be a subset of the questions and responses on the first user interface. The first and second users may communicate directly via the first and second user interfaces.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 3A:
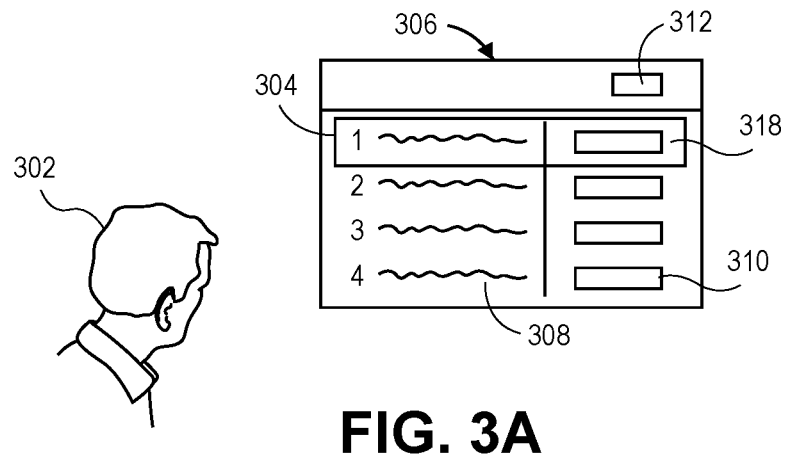
Figure 3B:
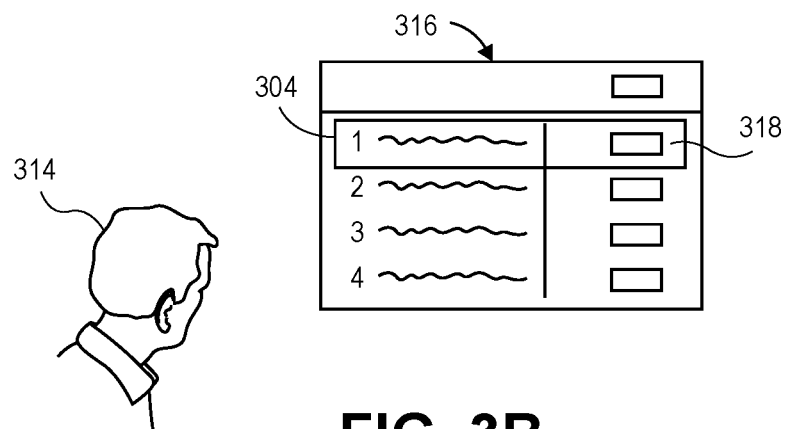
Figure 3C:
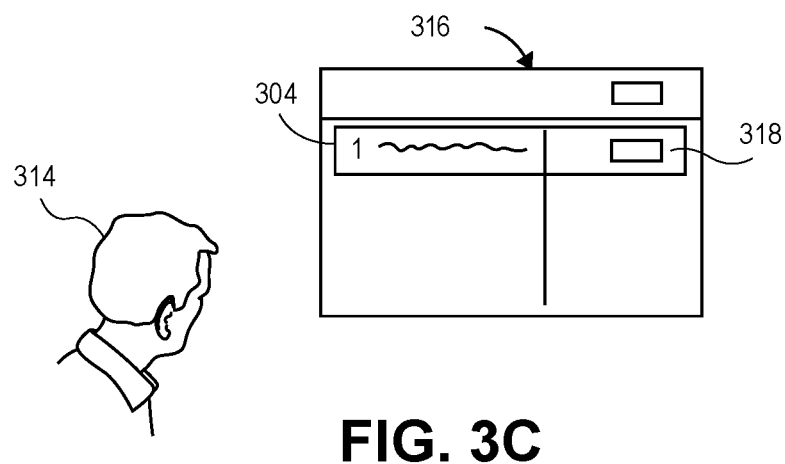

FIGS. 3A, 3B, and 3C depict user interface embodiments of the invention; and

Figure 4:
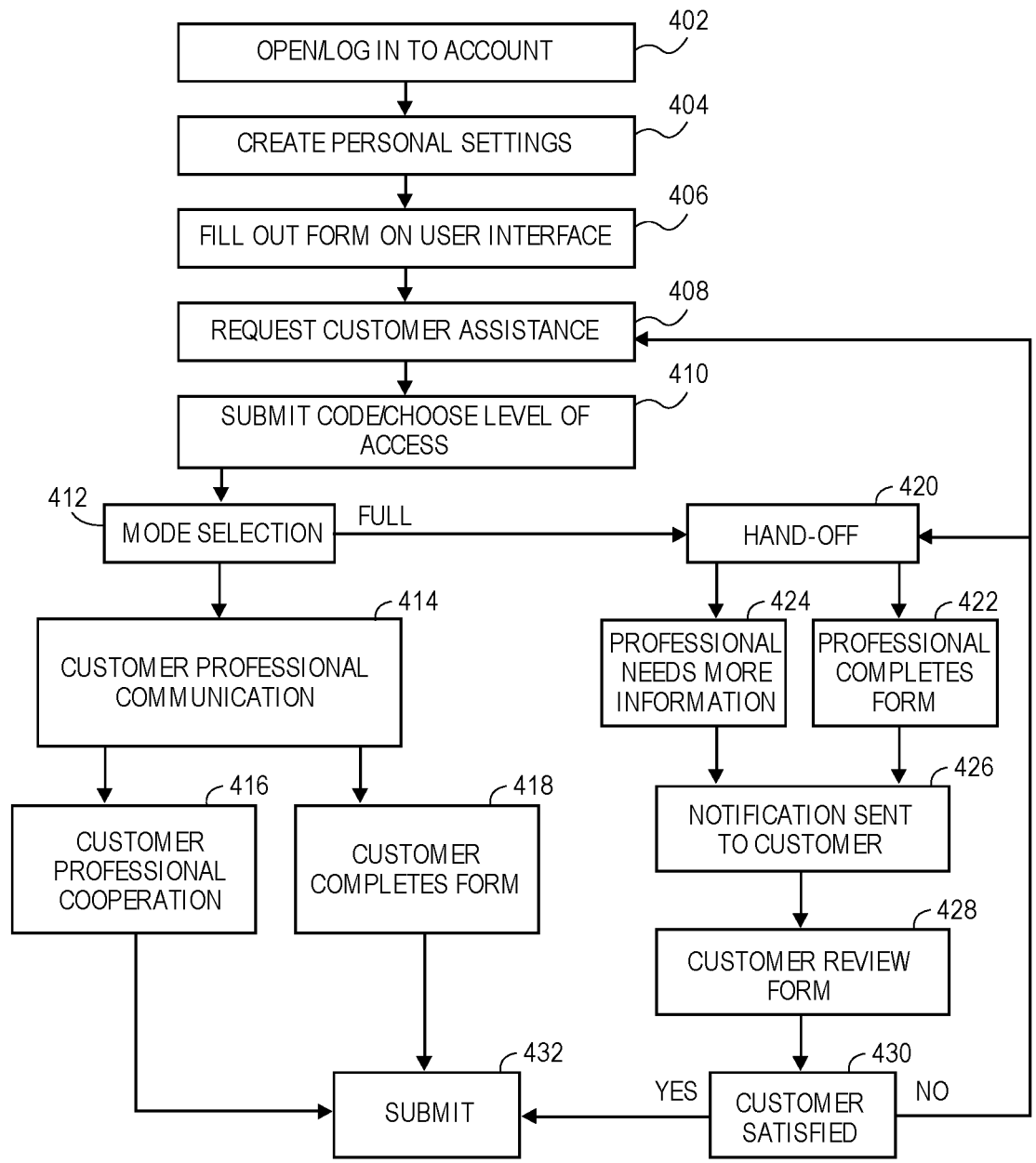

FIG. 4 depicts exemplary steps that represent an embodiment of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention provide for an online user interface that may be provided by a company.

The customer may use the interface to fill out forms. The forms may be for tax filing, accounting, automotive services, library book reservations, health information, grocery ordering for pick up, or any service that may require a customer to fill out a form that may be performed online. The customer may run into difficulties understanding or have technical issues while completing the form. The customer may then request customer assistance via the interface. The customer assistance may then be provided by direct or indirect communication with a professional that understands and has experience with the interface. The professional may then have access to all or portions of the form the customer is filling out. The professional may then help the customer to complete the form or fill out the form independently. The professional may have limited access to the form. Personal or confidential information may be requested in the form that the customer would like to conceal. This information may not be accessible by the professional. Levels of accessibility may be provided such as, display only, limited access, and full access. Within these levels sub-levels may exist. For example, in display mode the professional may view the entire document or may be restricted to pages, a page, or an individual question and answer referred to herein as a field. The professional may also be limited by access to a page, or a field, but also may be limited by the information that the professional may view. The level of accessibility may also be customizable by the customer.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Figure 1:
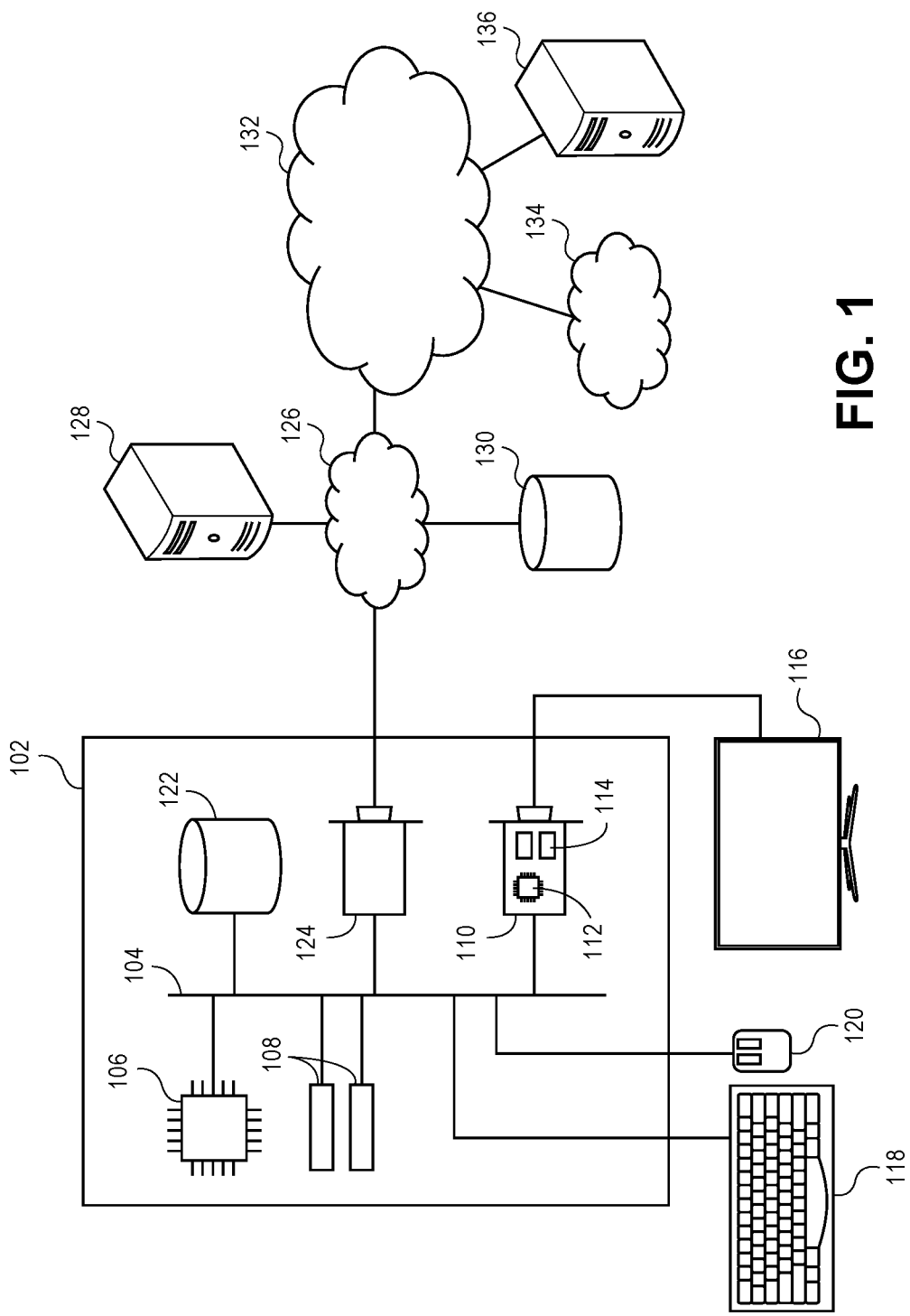
FIG. 1 depicts an exemplary hardware platform for certain embodiments of the invention.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also, attached to system bus 104 are one or more random-access memory (RAM) modules. Also, attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also, connected to system bus 104 is local storage 122, which may be any form of computer-readable media, and may be internally installed in computer 102 or externally and removeably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
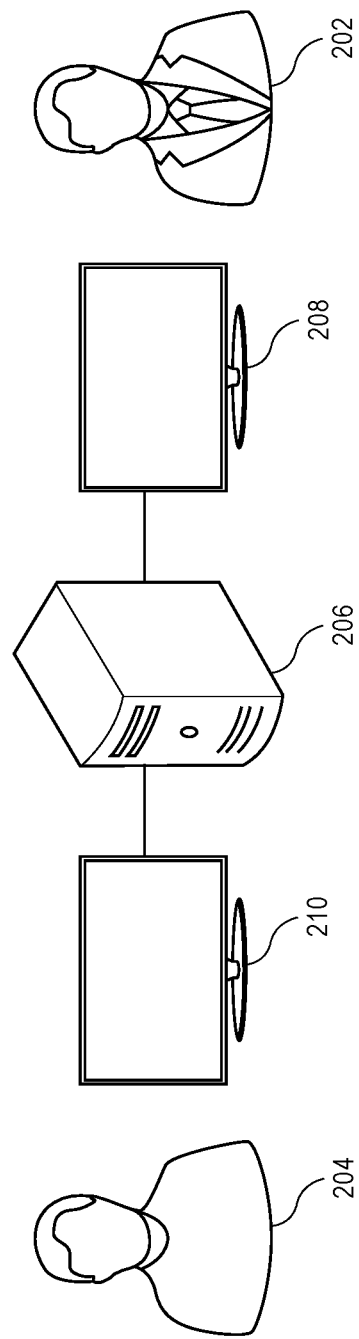
FIG. 2 depicts an exemplary hardware platform for certain embodiments of the invention.

Turning now to FIG. 2, another exemplary computer platform suitable for practicing embodiments of the invention is depicted and referred to generally by reference numeral 200. As depicted, professional 202 and customer 204 are jointly reviewing information from computer system 206 on their respective displays 208 and 210. Conventionally, multiple displays attached to computer system 206 would be controlled by a single user and display either identical information or completely different information. However, embodiments of the invention provide for joint control. The customer 204 may edit fields on the customer user interface and the professional 202 may edit fields on the professional interface. The professional 202 may have control, the customer 204 may have control, or the customer 204 and the professional 202 may be able to edit the fields. The information displayed on professional display 208 may be the same as, similar to, or contain partially the same information as on display 208.

As an exemplary scenario for illustrating the uses of the invention, the customer 204 may be a patient filling out health history information prior to a doctor's visit. Alternatively, the customer 204 may be a student taking an online class with an online user interface where the student may access, or complete assignments, and may request assistance from the professor 202. Similarly, professional 202 may be a lawyer, accountant, tax professional, or member of any other profession with customer 204 being the corresponding client. Alternatively, professional 202 and customer 204 may be peers.

In embodiments, computer system 206 comprises two or more communicatively coupled computers, with distinct computers controlling display 208 and 210. The computers may be directly connected by wire (e.g. Ethernet cable), or connected remotely or wirelessly (e.g., via Wi-Fi, or Bluetooth).

Devices such as computers and displays may be paired in a number of ways. The Internet Protocol (IP) address or domain name of a computer may be used when signing in over a network. This address or name may be used to identify a computer and allow preset login information. A login may be required, in which case a computer associated with the display 208 is then matched with a computer associated with the display 210 used by the professional 204, according to preferences submitted by the customer 202, or the professional 204, or as matched by the professional company. The match may be made according to the customer 202 inputs to provide the best service. The information may be stored in memory 114 or data store 122 so connection is automatic upon login by either the professional 202 or the customer 204. It also may be beneficial for the computers or displays to connect remotely. The device used by the customer 204 may be a personal computer or a personal mobile device.

The customer 204 may log into a computer, tablet, phone or any other personal electronic device capable of running the software application, and set up an account. The account may be associated with the customer 204 and accessible with a password, retinal scan, fingerprint identification or other method of identity verification. The customer 204 may save personal information on the account such as address, telephone number, social security number, or any other personal information that may be required or necessary for the software application. The information needed may relate directly to the software application presenting the user interface. The application may be medical information at a doctor's office, legal information, tax information, automotive service information, or any other service that may be accessible via user interface online.

In an exemplary embodiment depicted in FIG. 3, a customer 302 has logged into an account via a user interface exemplified by an online tax service. Online tax form 304 may be viewed on the computer display 306. Online tax form may be a 1040, 1099, W2 or any other tax document. This is exemplary and it should be noted that any online service, or user interface, including but not limited to the ones listed above, may be used. The tax form 304 may have questions 308 and a window for answers to the questions 310. Each field may be numbered 1, 2, 3, and so on containing one or more question and one or more window for an answer input from the customer 302. A help button 312 may also be presented to the customer 302 via the display 306. The help button 312 may be part of the same functionality as the tax form 304 but also may be separate. Separating the help button 312 from the tax form 304 may help to isolate the button 312 if there are any errors on the form 304. For example, if the tax form 304 is experiencing technical issues then the help button 312 may also not be working properly. In this case, the customer 302 may not be able to request assistance. If the help button 312 operates independently from the tax form 304 then while the tax form 304 software may be experiencing technical difficulties, the help button 312 may remain operational.

Continuing with the embodiment depicted in FIG. 3A, the customer 302 may have encountered a problem and needs to communicate with a customer service provider, which in this example may be a tax professional with experience using the software application interface displayed. The customer 302 may have a question regarding first field 318. The customer 302 may select the help button 312. Upon selection, the customer may be prompted with a few additional questions such as, are you experiencing technical issues, or do you have a question. The customer 302 may indicate only questions. A professional 314 depicted in FIG. 3B is contacted.

The communication between the professional and the customer may be but is not limited to text messaging, online chat, video chat, email, or any other form of online or telephony direct or indirect communication.

Since the customer 302 has a question, and has indicated so, the display 316, may present to the professional 314, the same online tax form 304 as is displayed to the customer 302. The automatic mode generated in this example displays the tax form 304 to the professional via display 316 but the professional 314 may not have permission to edit the tax form 304. The level of access the professional 314 has to the tax form 304 may be chosen by the customer 302, the professional 314, or be automatically chosen based on the customer's 302 response to the follow-up questions when requesting assistance. The professional 314 may be able to view the entire document, specific pages, a page, fields, or an individual field. This may be automatic or at the request of the customer 302. The professional 314 may be exempt from viewing specific information. For example, if the professional's access level determines that page 4 of the document is viewable but contains a field that displays the number of dependents of the customer 302 and the customer 302 has chosen to conceal this information, page 4 will be viewable but the particular field containing the information regarding the number of dependents will not be.

The type of information, or level of access, that may be shared by the customer 302 may be saved in settings and accessible by a unique code provided to, or by, the customer 302. For example, the customer 302 may be prompted to provide a number that may save the settings for which the customer 302 has decided. The customer 302 may choose not to release personal information such as social security number, address, or phone number, or may not want the professional to view gross income or charitable donations. These settings may be saved under a personal settings code. Once the customer 302 has requested help, the customer 302 may be prompted to input this personal settings code to apply the saved settings. Using the personal settings code the customer does not have to answer the questions each time making the customer service experience more efficient. The settings may be easily changed by inputting the personal settings code and accessing the settings.

During the customer service encounter, it may become obvious that the settings do not allow the professional 314 to accurately and quickly assess the issue. The customer 302 settings may be changed by the customer 302 while in communication with the professional 314 by accessing the settings online or requesting that the professional 314 change the settings. This may expedite the process further.

Some information may be necessary to facilitate a speedy service call. The information received by the professional 314 regarding the error and the customer 302 may be any subset of the following:

Current page the customer 302 is on.

The error message received.

Overall progress of the customer 302 in filling out the tax form 304.

All or some of the user information from the customer 302 account.

Customer 302 tax return history.

All expected documents to be filed with the return form 304.

History of customer 302 interaction with the user interface.

The above set of information that may be provided to the professional 304 is in no way limiting. Any information that may make the customer service experience more efficient or beneficial to the customer 302 or professional 314 may be accessible by the professional 314. The type of information accessible by the professional 314 may be determined by the professional 314, the customer 302, the customer settings, the customer history interaction with the interface, customer request, automatically by the software, or by the software error code. For example, the type of error may dictate the access level of the professional 314. The customer 302 may have trouble updating the information on page 7 of the document. Page 7 of the document relates to gross income for the current tax period and gross income for the previous tax period of the customer 302. The professional 314 may need gross income for the customer 302 from the previous period and the current period so this information is automatically available to the professional 314. If the information has been deemed restricted by the customer 302, the customer 302 may relay that information directly over the communication lines or may allow access immediately via the user interface.

Continuing with the embodiments depicted in FIGS. 3A, and 3B once the customer 302 and the professional 314 are in communication and the professional 314 has the needed information, the professional 314 may be able to answer the customer's 302 question. For example, the customer 302 may have a question regarding first field 318 in the tax form 304. The professional 314 may answer the question directly and quickly and the customer 302 may then halt communication and continue or stay in communication and continue. Alternatively, the question may relate to a different field on the same page or on a different page. The professional 314 may direct the customer 302 to the related field or the professional 314 may take over control of the interface and go to the related field without the assistance of the customer 302. This may be done with or without the customer's 302 consent.

In embodiments, the customer 302 may make changes to the tax form 304. For example, the customer 302 may answer a question in first field 318 such as what was your gross income for 2016. Upon inputting the value in the window the customer 302 then presses the enter key on the keyboard and the interface updates storing the newly input information. This is may be performed for each field. The update and storage of information may also be on a timer. For example, the information may be stored every 30 seconds. This ensures that if there is a malfunction, and the customer 302 may not be able to submit information, the customer 302 may begin from near where they left off since recently input information will be permanently stored.

In embodiments, the professional 314 may make changes to the tax form 304. For example, the customer may have an issue with the interface, specifically field 318 where they may be unable to input the gross income for the current year. After contacting the professional 314 via the help button 312 and allowing the professional 314 access to first field 318 of the tax form 304, the professional 314 may edit field 318 by inputting the gross income. The professional 314 may achieve this by acquiring administrative privileges to the customer's 302 computer and manipulating the input on the customer 302 end. In this example, the storage is updated from the customer 302 end via the professional 314. An added benefit of the customer 302 professional 314 direct communication and cooperation is that the professional 314 is understanding of the technical issues of the user interface. The professional 314 may relay this information immediately to the technical department to start working on getting the issue fixed.

In another example, the customer 302 and the professional 314 may be on the same dynamic website. The professional 314 may update the website but the information is not stored until the professional 314 updates the screen. This may occur when the professional 314 presses enter after inputting a value into the field 318 or after a specified time. The customer 302 may view the changes when the page is updated. When the page is updated the information may be saved automatically.

In another example, the customer 302 may log off after handing control of the tax form filing to the professional 304. The customer 302 may be instructed to wait a period of time before logging in or a notification may be sent when the tax form 304 is complete. The notification may be sent from the professional 314 when the tax form 304 is complete or may be sent automatically when the final completed tax form 304 is submitted by the professional 314.

It should be reiterated that the above and below embodiments are exemplary only. The customer service and user interface provided may apply to any online software and customer interaction where customer service may be useful. This may apply to, but is not limited to, tax filing as in the examples used herein. The features disclosed herein may also apply to a doctor's office visit or online check in, an ecommerce site, accounting, airline booking or check in, or any other online customer service interface.

In an exemplary embodiment depicted in FIG. 3C, the professional 314 may have limited access to the tax form 304 on the display 316. The customer 302 may have an issue with field 318. The customer 302 may request professional assistance via help button 312. The customer may then activate the level of access available to the professional 314 by entering a privacy code or simply indicating the level desired. The level of access of the professional 314 and the settings the customer 302 chooses may be saved using a customer settings code. The customer 302 may request limited access, thus displaying only field 318 to the professional 314. With this field displayed, and the automatic information that may be provided such as the customer's 302 previous tax forms, and interface history, and through communication with the customer 302, the professional 314 may be able to quickly and efficiently resolve the issue. However, with the limited information available to the professional 314 additional information such as other fields, and other pages of the tax form 304 may be required to resolve the issue. The professional 314 may request to see the additional information from the customer 302. Customer 302 may grant permission and through the additional information the professional 314 may resolve the issue.

Though FIG. 3C depicts only field 318 displayed to the professional 314. The information displayed and the editable information access may be different. For example, the entire page, or the entire tax document 304 may be displayed to the professional but the professional 314 may only be allowed to edit field 318. Alternatively, the professional 314 may only be able to edit what is displayed. Different levels of access may be presented to the professional 314. The professional 314 may have full access to view the document but limited to only editing pages, a page, or a field. Any combination of access between modes may be presented to the professional 314.

The access given to the professional 314 may also be limited automatically based on the customer 302 issue or error that the software detects. For example, the professional 314 may only have access to information required to fix the issue. The customer 302 may have a question regarding number of dependents on page 4. The professional 314 may have display access to page 4 but only limited access to edit the particular field regarding number of dependents. The customer 302 may use a customizable function to allow the professional 314 to have access to personal information regarding the dependents of the customer 302. Once the professional 314 has made a judgment based on the customer 302 information the professional 314 may fill in the appropriate information and hand the form back to the customer 302 or continue assistance at the customer's 302 request.

In limited and display modes, there may be predetermined settings that may expedite the process. The customer 302 may choose a predetermined level of access that best suites the customer 302. For example, the customer 302 may not like to have previous tax information available to the professional 314. If this tends to be a popular option, it may be a predetermined level of access. When a customer 302 chooses this option, the professional 314 does not have access to this information. Customizable options may be available on the user interface regarding the predetermined options. The customer 302 may realize that the professional 314 may need previous gross income to resolve the issue so access may be granted to the previous gross income to the professional 314 in the customizable feature. The professional 314 may also request more information from the customer 302 and the customer 302 may grant access via the customizable option on the user interface or by direct communication.

In another exemplary embodiment, the customer 302 may grant the professional 314 full access to the tax form 304. Full access may allow the professional 314 the ability to edit the entire form 304. Though the professional 314 has full access to the form 304 there may still be restrictions to the customer 302 information that is attainable by the professional 314. For example, the customer 302 may still restrict access to personal information. The professional may not see the customer's 302 phone number, social security number, personal code, tax filing history, personal tax records, or any other account data as the customer 302 has chosen to keep restricted. At any point the customer 302 may choose to release this information to the professional 314 as it may be necessary for completion of the tax form 304. While the tax professional 314 fills out the tax form 304 the customer 302 may be in communication with the professional 314. In this way, the customer 302 may learn more about the process and become better prepared to do the filing themselves at the next quarter, next year, or the next time the customer 302 fills out a tax form.

In another example of an embodiment of the invention, the customer 302 may hand-off the tax form 304 to the professional 314. The customer 302 may have had several problems or technical issues and may not want to continue working on the tax form 304. At this point the customer 302 may select the help button 312 and choose to hand-off control of the tax filing to the professional 314. This may give the professional full access to the tax form 304. The customer 302 may choose to stay online and view the updates or may choose to exit and not have any communication or involvement until the tax form 304 is complete. A time for completion may be issued to the customer 302 so the customer 302 knows when the tax form 304 is complete, or a notification may be sent to the customer 302 from the professional 314, or from an automatic system when the tax form 304 is complete. Once complete, the customer 302 may review the tax form 304 and contact the professional 314 with any questions.

Contact between the customer 302 and the professional 314 facilitates awareness for the professional 314 to the problems that the customer 302 faces while interacting with the user interface. The professional 314 may see, step by step, the process the customer 302 goes through while filling out the tax form 304. This may give the professional 314 better insight as to what may be causing confusion for customers filling out tax forms. The professional 314 may be able to more thoroughly understand the issues that slow down customers or cause customers to use the help button 312. Customers typically fill out a questionnaire or write comments as to why they had trouble. The message may be better understood by the professional when the steps are taken together rather than just reading comments.

The interactions between the customer 302 and professional 314 may be recorded. The recordings may be used to evaluate the professional 314, but may also be used to determine when the problems for the customer 302 begin. It may be discovered that customers are having many of the same issues. This may lead to the discovery of a technical issue, a question that is difficult to understand, or difficulty in navigating the tax form 304. These issues may be found by the tax professional 314 and the recordings used to present to the technical staff or the technical staff may review selected recordings to determine changes that may be implemented to make the process easier for the customer 302 and more efficient. The professional 314 and the customer 302 may also fill out a report after the encounter outlining the process and possible issues, concerns, and improvements. The direct communication between the customer 302 and the professional 314 may keep them on the same page and may make the review process run smoother and more efficiently.

FIG. 4 presents an exemplary flow diagram illustrating various steps of embodiments of the invention. Generally, a customer may set up an account on a company's website. The customer may user the online user interface of the company to fill out documents, questionnaires, service requests, or any type of online service that may be available. During the process of completing the form, the customer may have questions or encounter problems. The customer may then request customer assistance. The customer assistance may be presented in direct contact with a professional that is experienced in the software interface the customer is using. The professional may also have information about the customer and the customer history in regard to the subject matter of the document. The customer and the professional may then work together to complete the form or the customer may hand over the process to the professional. Alternatively, the customer may have a question that requires a quick answer and the customer may continue without the assistance of the professional. Additionally, the embodiments depicted in FIGS. 3A-3C, and described above may be applied to the steps presented in FIG. 4.

In step 402 the customer may open an account or log into an account. The account may be an online tax filing service or any of the above-mentioned services. The user may log into the account using a password and identification code on a personal computer, laptop, mobile device, or any other device that may be capable.

The customer may create personal settings in step 404. The customer may choose the information that may be accessible to the professional such as, tax history, number of dependents, marital status, or any other information that may be relevant to the forms to be completed. The customer may set up a profile that stores the information the customer chooses to conceal. This may be accessed by a personal settings code that may be provided by the customer at any point during the process. There may also be information that is necessary for the professional to view in order to fill out the form without the customer's consent such as gross income for year in question, gross income for the previous year, or any other information that may be necessary to complete the document.

Once the account is set up and personal settings are saved the customer may move on the step 406, filling out the form. The form may provide questions to gather information regarding previous tax filing information, personal information, assets, income, dependents, or any other information related to federal or state taxes. The user interface may also provide a window for the customer to input the requested information.

While completing the form a customer may have questions or run into problems filling in the requested information. Step 408 may be performed by selecting on the user interface a request for customer assistance. The selection may place the customer in direct communication with the professional via online chat, online video chat, online voice chat, email, telephone, or any other direct or indirect line of communication. Prior to communication with professional the customer may be prompted to provide a level of access of the professional.

In step 410 the customer provides information that may be presentable to the professional. The information provided may be defined by the customer personal setting code that may also have been established in step 404. If no personal settings were established then the accessible information may be provided in step 410. Alternatively, if it is determined by the software that the issue may be resolved with a set of required information step 410 may be skipped altogether.

In step 412 the level of access or modes of service provided to the professional may be determined. Three mode selections indicative of the levels of access may be used and the three modes may have any combination of sublevels of access. The three modes may be full access, limited access, and display only. Within limited access and display mode sublevels of varying access may be determined by the customer, the professional or automatically by the software.

To expedite the process, predetermined levels of limited access may be stored. These levels may be based on statistical analysis of information that is provided by the customers. For example, if there are many customers that wish to have their prior tax history concealed from the professional there may be a level that is predetermined that has this requirement. The predetermined levels may have any combination of information provided for tax purposes and any combination of levels of access. The customer may also provide custom access that may be based on a predetermined access level with slight alterations. For example, a low access level conceals the customer's gross income and number of dependents from the professional. The customer knows that, in order to respond to the customer request, the professional will need the gross income amount. The concealment of this feature may simply be turned off in the custom feature. The customer may also provide the professional with the customer's personal settings code and the professional may be able to access the information needed.

The full access option may provide the professional with full access to the document to be completed in the interface. Full access may not provide the professional with the personal information of the customer. Access to the customer information may be granted by the customer and some of the personal information may be accessed based on need. Full access may also provide the professional with information from previous documents filled out by the customer and information on associated documents filled out by the customer. Full access may provide the professional with any and all information necessary for the completion of the document.

Display mode may have sublevels of access if the customer has determined that some portions of the document be concealed or if it is unnecessary for the professional to view portions of the document. Display mode does not allow the professional to make any changes to the document. This mode only allows the professional to view the portions of the document that are allowed.

In step 414 the customer and professional may be in communication to solve the problem. The communication may be via online messaging, video, email, text messaging, telephone, or any other direct or indirect communication. The professional and the customer may solve the problem and the customer may continue completing the form independently as in step 418 or may choose to continue with the aid of the professional as in step 416.

Step 420 provides an alternative to customer form completion, or customer professional cooperation. The customer may be overwhelmed with the procedure and hand-off the document to the professional. The issues may be communicated by any of the methods above, and the professional may complete the form without the customer's involvement in step 422. The customer may log out of the interface. Once complete, the professional may send a notification or a notification may automatically be sent to the customer informing the customer that the form has been completed as in step 426. Alternatively, the professional may be unable to complete the form and more information may be required as in step 424. Again, the professional may send a notification requesting communication with the customer as in step 426.

The customer reviews the file in step 428. If the customer is satisfied with the form in step 430 the customer may submit the file in step 432. The customer may not be satisfied or the professional may have requested more information. The customer may request customer assistance as in step 408 yet this time requesting the professional that has been working on the form.

It should be noted that the flow chart may be in any order as allowed without losing functionality. For example, the level and the mode may be chosen simultaneously or sequentially. In another example the level and mode may be chosen after contact with the professional and the professional may facilitate the requests of the customer in this regard. Any step may also be omitted if necessary to quickly provide service. For example, the level of the professional access to the customer's information may be directly related to the issue the customer is having. The level may automatically be chosen therefor eliminating the need for the customer to decide as in step 410.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system, comprising at least one processor, for providing a first user interface to a first user on a first display and a second user interface to a second user on a second display, comprising:
    a first computer communicatively coupled to the first display operated by the first user; and
    a second computer communicatively coupled to the second display operated by the second user,
    wherein the second computer and the first computer are communicatively coupled,
    wherein the first computer provides a first interface to the first user on the first display,
    wherein the first interface provides a set of questions and associated response fields to the first user,
    wherein a first response field of the associated response fields enables the first user to input a response to an associated first question of the set of questions,
    wherein the first interface provides a request for assistance option to the first user,
    wherein the second computer provides a second user interface to the second user,
    wherein the first user submits a request for assistance and the request for assistance is sent to the second user interface,
    wherein the second user can accept the request for assistance from the first user via the second user interface,
    wherein the second user interface receives and displays only the first response field of the associated response fields and the associated first question,
    wherein the first response field and the associated first question are displayed based on a previously stored level of access granted by the first user to the second user,
    wherein the previously stored level of access is stored in customer settings,
    wherein the second user interface provides a link to the first user interface enabling communication between the first user and the second user,
    wherein the second user has access to, and can edit, only the first response field, and
    wherein the level of access of the second user to the first response field and the first associated question of the first user interface is customizable by the first user.

2. The system of claim 1, wherein the second user interface further provides information indicative of the interaction history of the first user with the first interface.

3. The system of claim 1, wherein the communication between the first user and the second user is video chat.

4. The system of claim 1, wherein the request for assistance provides options to the first user for limiting information provided to the second user interface to the first response field.

5. The system of claim 4, wherein the information provided to the second user is produced based on the options chosen by the first user.

6. The system of claim 1, wherein the request for assistance provides additional questions to the first user via the first user interface.

7. The system of claim 6, wherein information provided to the second user, including the first response field, is determined automatically based on responses to the additional questions.

8. One or more non-transitory computer-readable media storing computer-executable instructions that, when executed by a processor, perform a method for a first user on a first user interface to communicate with a second user on a second user interface, comprising:
    displaying a set of questions to the first user via a first user interface on a first display;
    displaying a set of response fields associated with the set of questions;
    providing, via the first user interface, a field for response to a question of the set of questions by the first user;
    providing an option for requesting assistance via the first user interface by the first user to communicate with a second user via a second user interface,
    wherein the first user submits a request for assistance by selecting the option for requesting assistance;

displaying information indicative of the first user interface to the second user on the second user interface;

providing communication between the first user and the second user, wherein the field for response accepts a response to the question from the first user; and receiving and displaying only the field for response and the question to the second user on the second user interface, wherein the field for response and the question are displayed based on a previously stored level of access granted by the first user to the second user, wherein the previously stored level of access is stored in customer settings, wherein the field for response and the question are selected by the first user, and wherein the response is editable by the second user on the second user interface.

9. The media of claim 8, wherein the communication between the first user and the second user is at least one of an online video chat, an online voice chat, and an online chat.

10. The media of claim 8, wherein the request for assistance provides questions to the first user for limiting the information provided to the second user interface.

11. The media of claim 10, wherein the information displayed to the second user via the second user interface is automatically determined from responses to the set of questions provided by the request for assistance.

12. The media of claim 8, wherein the second user edits the response on the first user interface without the assistance of the first user.

13. A method for a first user on a first user interface to communicate with a second user on a second user interface, comprising:

displaying a set of questions to the first user via a first user interface on a first display;

providing via the first user interface a set fields for responses to the set of questions by the first user, wherein responses are provided in the set of fields by the first user;

providing an option for requesting assistance via the first user interface by the first user to communicate with a second user via a second user interface, wherein the first user submits a request for assistance by selecting the option for requesting assistance;

displaying information indicative of the first user interface to a second user on the second user interface, wherein the information received and provided to the second user via the second user interface is only a plurality of fields of the set of questions and responses on the first user interface, wherein the plurality of fields of the set of questions and responses is displayed based on a previously stored level of access granted by the first user to the second user, wherein the previously stored level of access is stored in customer settings, wherein the plurality of fields is editable by the second user, wherein the plurality of fields is determined by the first user; and providing communication between the first user and the second user.

14. The method of claim 13, further providing an option to the first user on the first user interface for storing personal settings via a personal user code indicative of the information to be displayed on the second user interface.

15. The method of claim 13, wherein some responses of the responses to the set of questions on the first user interface are not editable by the second user.

16. The method of claim 13, wherein the first user interface further provides the first user with an option to allow the responses in the first user interface to be editable by the second user via the second user interface.

17. The method of claim 13, wherein the information provided to the second user interface is automatically displayed.

18. The method of claim 13, wherein the communication between the first user and the second user is at least one of an online video chat, an online voice chat, an online chat, an email, and a telephone call.

19. The method of claim 13, wherein the second user interface further provides information indicative of the interaction history of the first user with the first user interface.

20. The method of claim 13, wherein the request for assistance provides additional questions to the first user via the first user interface.

* * * * *